United States Patent
Wells et al.

(10) Patent No.: US 10,521,477 B1
(45) Date of Patent: Dec. 31, 2019

(54) OPTIMIZED LOCATION IDENTIFICATION

(71) Applicant: Amazon Technologies, Inc., Seattle, WA (US)

(72) Inventors: Brandon Wells, Sammamish, WA (US); Linh Kim Lam, Seattle, WA (US); Sean Mesnick, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 565 days.

(21) Appl. No.: 15/278,424

(22) Filed: Sep. 28, 2016

(51) Int. Cl.
*G06F 16/9038* (2019.01)
*G06F 16/29* (2019.01)
*G06F 16/907* (2019.01)

(52) U.S. Cl.
CPC .......... *G06F 16/9038* (2019.01); *G06F 16/29* (2019.01); *G06F 16/907* (2019.01)

(58) Field of Classification Search
CPC ..... G06F 16/29; G06F 16/907; G06F 16/9038
USPC .......................................................... 707/724
See application file for complete search history.

(56) References Cited

U.S. PATENT DOCUMENTS

| | | | | |
|---|---|---|---|---|
| 2014/0274154 | A1* | 9/2014 | Rana | G06F 16/21 455/456.3 |
| 2014/0280318 | A1* | 9/2014 | Simms | G06F 16/29 707/769 |
| 2015/0186821 | A1* | 7/2015 | Wang | G06Q 10/0639 705/2 |
| 2015/0264523 | A1* | 9/2015 | Xu | H04W 4/021 455/456.3 |
| 2017/0249496 | A1* | 8/2017 | Fentzke | G06K 9/00657 |
| 2018/0075327 | A1* | 3/2018 | Rubinton | G06K 15/1819 |

* cited by examiner

*Primary Examiner* — Robert W Beausoliel, Jr.
*Assistant Examiner* — Pedro J Santos
(74) *Attorney, Agent, or Firm* — Thomas Horstemeyer, LLP

(57) ABSTRACT

Disclosed are various embodiments for optimizing location searches using geohash codes. A common prefix for a plurality of geohash codes associated with a respective one of a plurality of bounding boxes is identified, wherein each of the plurality of bounding boxes represents a geographic area. A location identifier from another computing device is received. A geohash code based at least in part on the location identifier is identified. The geohash code is then compared with the common prefix for each of the plurality of bounding boxes. Next, a list of common prefixes that match the geohash code. A list of respective geographic areas is returned to the other computing device based at least in part on the list of common prefixes.

20 Claims, 5 Drawing Sheets

OPTIMIZED LOCATION IDENTIFICATION

BACKGROUND

Locations are often identified based on a combination of a ZIP code, city, and state. However, this combination of identifiers does not always produce an accurate result. For example, a mailing address with a specific city, state, and ZIP code may actually be located outside of the city limits but still be within the service area identified by the ZIP code.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
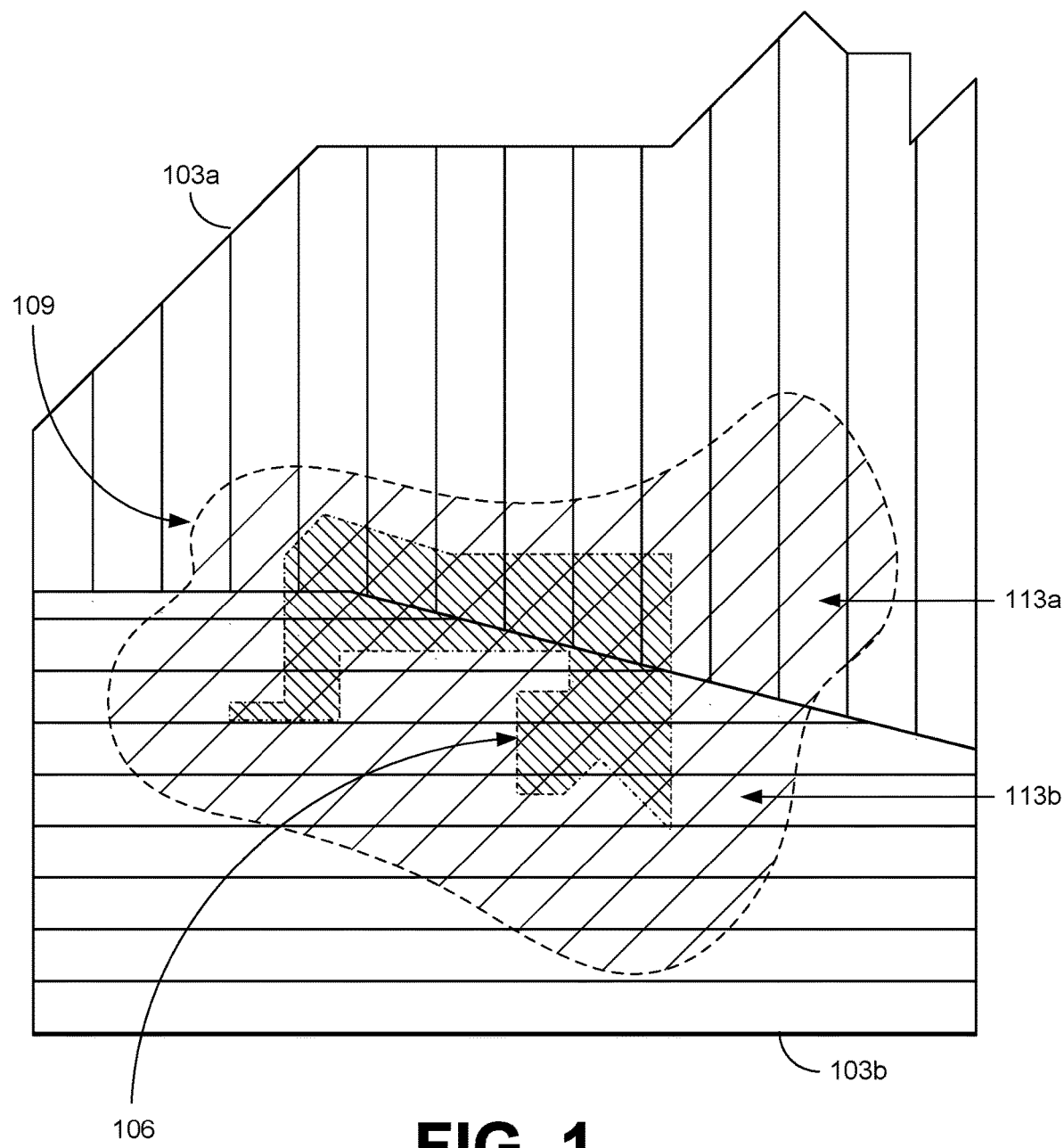
FIG. 1 is a drawing depicting one of several embodiments of the present disclosure.

Disclosed are various embodiments for identifying overlapping bounding boxes that enclose a given location. A bounding box represents an enclosed area within a region. For example, a bounding box could be used to represent the city-limits for a municipality, the borders of a county, state, or country, the boundaries of a special local option sales tax (SPLOST) or local option sales tax (LOST) district (e.g., a water district, fire district, school district, etc.), or the metes and bounds of any other political entity. Some of these bounding boxes overlap. Accordingly, a location (e.g., a street address for house) could fall within multiple bounding boxes. For example, a house could be within the boundaries of a city, a county, and a state.

However, the boundaries of political entities do not necessarily overlap in a hierarchical fashion. For example, the city limits of a municipality may encompass portions of multiple counties. As another example, a SPLOST or LOST district may encompass multiple municipalities or other entities. For example, a water or other utility district may encompass multiple cities or counties within a region. As a result, the presence of a location within the boundaries of one political entity does not necessarily indicate whether the location is also present within the boundaries of another political entity. For example, the city limits of Atlanta, Ga. encompass areas of Fulton and DeKalb counties. Without additional information, one cannot use the knowledge that a location is within Atlanta, Ga. to determine whether the location is also in Fulton or DeKalb county.

Some other approaches to determining each of the political entities that encompass a given location attempt to use the presence of a location within a smaller bounded area as a proxy for determining that a location is within a larger area. For example, ZIP Codes are used by the United States Postal Service (U.S.P.S.) to route mail to specific post office branches for delivery. Due to the relatively small size of the delivery area for a given post office, the area encompassed by a given ZIP code tends to be small relative to other political entities. As a result, the area encompassed by a ZIP code tends to be entirely within the boundaries of another political entity (e.g., a city, a state, a county, etc.). However, even this system is imperfect. For example, the ZIP code for some areas may include areas in multiple adjacent cities. As another example, the area encompassing a ZIP code may include the entirety of a municipality as well as some of the unincorporated area outside of the municipality.

While this accuracy is sufficient for some purposes, it is not sufficiently accurate for other purposes. For example, a ZIP code may provide a sufficient level accuracy when determining a city, state, or county that a location is within when estimating the shipping costs to that location. However, the ZIP code may not provide sufficient accuracy when trying to calculate an applicable sales tax.

For example, many different government entities may be authorized to levy a sales tax on a transaction within their borders. This could include state sales tax, city sales tax, county sales tax, school district sales tax, water district sales tax, fire district sales tax, business improvement district sales tax, as well as taxes levied by other entities. As these boundaries do not necessarily overlap, it is possible that one house on a street is within the same city, state, county, and school district as its neighbor, but is in a different water district and fire district as its neighbors. While the two houses may use the same ZIP code for mailing purposes, the sales tax liabilities for a company shipping items to the two houses could differ because the neighboring houses are not located in the same set of districts. While it is possible to map and index each address in the United States to a corresponding set of tax districts, this would present performance problems at scale and would require a significant amount of storage space. However, geohashes can be used to quickly and accurately identify the set of tax districts a given location lies within.

As illustrated in FIG. 1, multiple regions may overlap each other such that a location within one region does not necessarily fall within another region. For example, two counties 103a and 103b may adjoin each other. The boundaries of a municipality 106, such as a city, town, village, etc., may encompass land in both counties 103a and 103b. A postal service zone 109 defined by a postal code, such as a ZIP code, could encompass the entire municipality 106 as well as additional, unincorporated areas 113a and 113b of the counties 103a and 103b. Accordingly, any location within the municipality 106 would have an address with a ZIP code corresponding to the postal service zone 109. However, the reverse is not true—a location with the ZIP code to the postal service zone 109 could be inside the municipality 106 or outside the municipality 106 and could further be located in one of two counties 103a and 103b.

Although FIG. 1 shows each jurisdiction as a single, contiguous area, this is not always the case. In some instances, a single jurisdiction could include one or more exclaves that are disconnected from the main portion of the jurisdiction. For example, the state of Hawaii in the United States includes a chain of islands unconnected to each other. As another example, the city of Kaliningrad and the surrounding Kaliningrad Oblast of Russia are physically separated from the rest of Russia by the countries of Lithuania, Poland, Belarus, and Latvia.

While this level of accuracy may be good enough in some applications, it is insufficient in others. For example, the first county 103*a* could implement a sales tax while the second county 103*b* may not. In addition, the municipality 106 may also implement a sales tax. Accordingly, a buyer within the postal service zone 109 could be subject to any one of four sales tax rates. For example, if the buyer lived within the first county 103*a*, but lived outside of the municipality 106, a buyer may not have to pay any sales tax. If the buyer lives within portion of the municipality 106 that was within the first county 103*a*, the buyer would have to pay a sales tax on transactions equal to the rate charged by the municipality 106. Likewise, if the buyer lives within the second county 103*b*, but lived outside of the municipality 106, a buyer may not have to pay the sales tax rate charged by the second county 103*b*. If the buyer lived within a portion of the municipality 106 that is within the second county 103*b*, the buyer would have to pay a sales tax on transactions equal to the rate charged by the second county 103*b* and the municipality 106.

A seller shipping an item to a buyer would need to determine which of the four potential sales tax rates to charge the buyer. To accurately determine which of the four sales tax rates to charge the buyer, the seller could map the boundary of the municipality 106 over the two counties 103*a* and 103*b*. The seller could then generate geohash codes for each location with the municipality 106 and the two counties 103*a* and 103*b*. Based on the geohash codes, the seller could determine which region of the two counties 103*a* and 103*b* and municipality 106 the buyer is located in, and charge the appropriate sales tax rate.

A geohash code, also known more simply as a geohash, is a hierarchical spatial data structure which subdivides space into buckets corresponding to individual cells in a grid. Geohash codes have a number of properties that make them valuable for location determination. First, geohash codes have arbitrary precision, with longer codes offering a more precise location representation. As bits are removed from the geohash code to reduce its size, precision is lost. As a consequence, locations that are near each other often have the same prefix, with locations that are closer to each other having a longer prefix than locations that are more distant from each other. Second, geohash codes can often be stored more efficiently than corresponding systems, like latitude and longitude coordinates.

A geohash code is often stored in an alphanumeric format representing a binary encoding of a pair of latitude and longitude coordinates. For example, some common implementations may use a base-32 alphanumeric implementation to represent the binary encoding of the pair of latitude and longitude coordinates. However, other representations, such as base-16, base-36, and base-64 may be used. In a base-32 representation, the following character map may be used to convert a geohash code from base-32 into binary.

However, other character maps can also be used for a base-32 representation. Likewise, other implementations, such as base-16 or base-64, would use different character maps.

To decode a geohash, such as "bcd913jk," into the corresponding latitude and longitude, the following process would be performed. First, the geohash would be converted into a binary representation using the character map. In the case of "bcd913jk," the corresponding binary sequence would be "01010 01011 01100 01001 00011 10010." Assuming that counting starts at 0 on the left side, and that the even bits represent longitude and the odd bits represent latitude, then the longitude coordinate would be "000110101000101" and the latitude coordinate would be "110011000101100." However, other implementations may begin counting from the right or encode the latitude as the even bits and the longitude as the odd bits instead.

To determine the latitude and longitude coordinates, each binary code is subjected to a series of division operations on a bit-by-bit basis. In the example implementation, the longitude coordinate interval of −180° to +180° is divided by 2, producing two intervals: −180° to 0° and 0° to +180°. Since the first bit is "0," the lower interval of −180° to 0° is chosen and becomes the current interval. The procedure is repeated again, with the interval of −180° to 0° being divided by 2 into two intervals of −180° to −90° and −90° to 0°. Since the second bit is "0," the lower interval of −180° to −90° is chosen. The procedure is repeated again for each bit in the code. The final longitude would be −142.67206192°. Latitudes are processed in an equivalent manner, although the initial interval is −90° to 90°. In this example implementation, the value for the latitude would be 53.61954689°.

A similar process is followed to generate a geohash code. For example, to convert a latitude and a longitude coordinate of 74.19238475°, 49.47000695° into a geohash code of "vj5njdqc," one would use the following process. For the longitude of 49.47000695°, the longitude coordinate interval of −180° to +180° is divided by 2, producing two intervals: −180° to 0° and 0° to +180°. A bit is assigned based on the interval that the longitude coordinate falls in. In this example, a first bit with a value of "1" is assigned because the longitude coordinate of 49.47000695 falls within the interval of 0° to +180°. This interval is then divided again into two intervals of 0° to +90° and +90° to +180°. Because the longitude coordinate of 49.47000695 falls within the lower interval of 0° to +90°, a second bit with a value of "0" is assigned. The process is repeated until a number of bits equal to a sufficient precision have been assigned to the longitude value. A similar process is used for generating a binary representation of the latitude coordinate, although the initial interval is −90° to 90°. The bits are then combined into a single geohash code, with the even bits representing longitude and the odd bits representing latitude in one

| Decimal | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| base-32 | 0 | 1 | 2 | 3 | 4 | 5 | 6 | 7 | 8 | 9 | b | c | d | e | f | g |
| Decimal | 16 | 17 | 18 | 19 | 20 | 21 | 22 | 23 | 24 | 25 | 26 | 27 | 28 | 29 | 30 | 31 |
| base-32 | h | j | k | m | n | p | q | r | s | t | u | v | w | x | y | z | implementation. However, other implementations could use the even bits to represent latitude and the odd bits to represent longitude.

Figure 2:
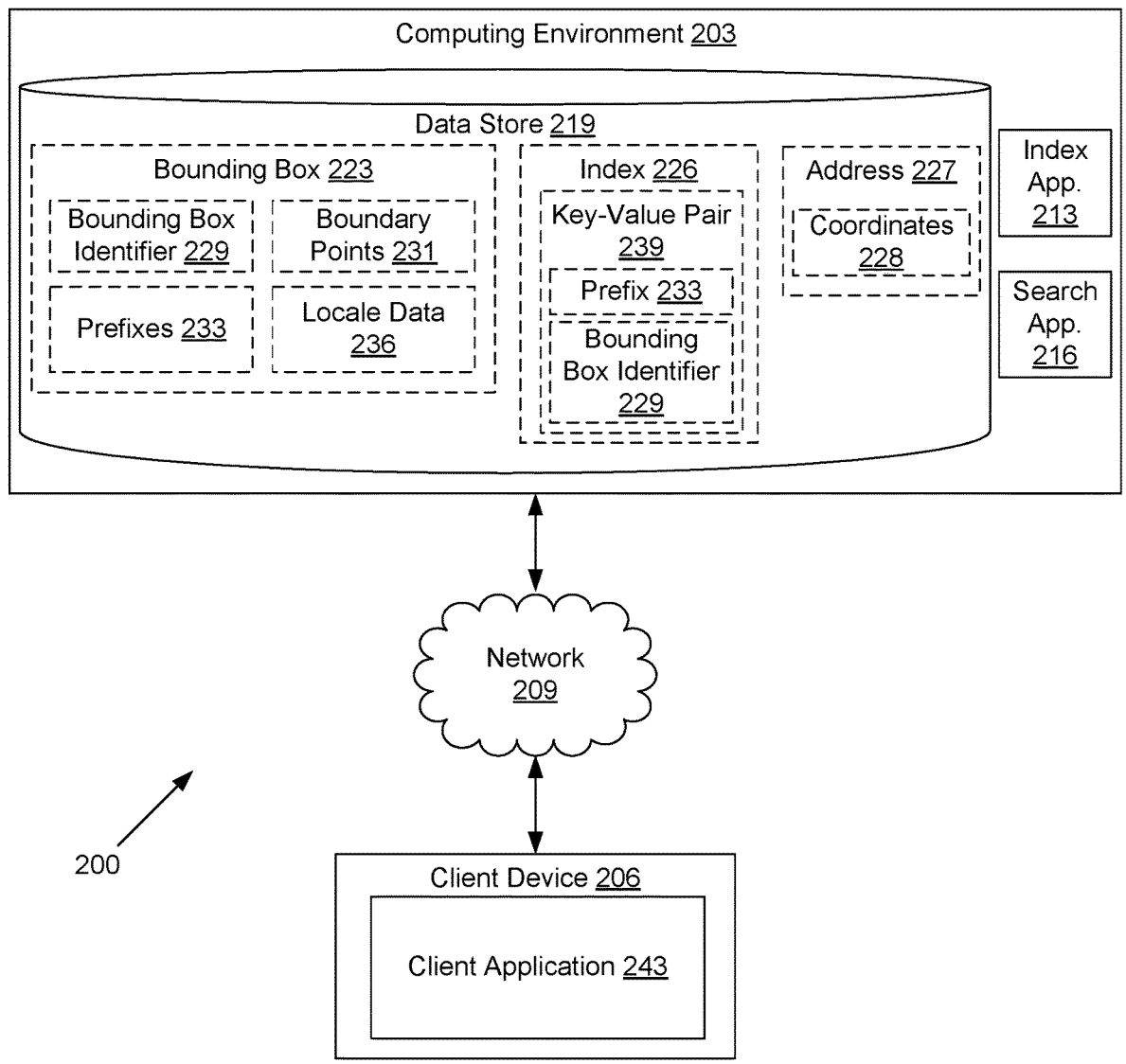
FIG. 2 is a drawing of a networked environment according to various embodiments of the present disclosure.

With reference to FIG. 2, shown is a networked environment 200 according to various embodiments. The networked environment 200 includes a computing environment 203, a client device 206, and potentially other devices, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time. Various applications or other functionality may be executed in the computing environment 203 according to various embodiments. The components executed on the computing environment 203, for example, include an index application 213, a search application 216, and other applications, services, processes, systems, engines, or functionality not discussed in detail herein.

Also, various data is stored in a data store 219 that is accessible to the computing environment 203. The data store 219 may be representative of a plurality of data stores 219, which can include relational databases, object-oriented databases, hierarchical databases, key-value data stores (e.g., hash tables, lookup tables, index tables, and similar key-value data stores or structures), as well as other data storage applications or data structures. The data stored in the data store 219 is associated with the operation of the various applications or functional entities described below. This data can include data related to one or more bounding boxes 223, and an index of 226 of the bounding boxes 223 and corresponding geohash codes, one or more addresses 227, as well as potentially other data.

The bounding box 223 represents the boundaries of a geographic area. The boundaries may be defined as the lines between a set of points (e.g., lines connecting a set of latitude and longitude coordinate points, lines connecting a set of points on a Cartesian plane, or other set of points). A bounding box 223 can be used, for example, to represent the boundaries of a political entity, such as the boundaries of a country, province, state, city, county, parish, SPLOST or LOST district (e.g., school district, fire district, water district, etc.), or other political entity or region. Accordingly, a bounding box 223 can be in the shape of any regular or irregular polygon.

The bounding box 223 can also represent an intersection of two or more bounding boxes 223. For example, if the city-limits of a municipality extend into two counties, there may be a first bounding box 223 representing the city-limits of the municipality, a second and a third bounding box 223 that represent the borders of each county, a fourth bounding box 223 that represents the portion of the municipality within the first county, and a fifth bounding box 223 that represents the portion of the municipality within the second county. Use of bounding boxes 223 in such a manner can allow applications to find a single bounding box 223 for a location that represents all applicable jurisdictions instead of alternatively individually identifying each bounding box 223 representing a single political entity that encompasses a location.

A bounding box 223 can include a bounding box identifier 229, a set of boundary points 231, a set of geohash prefixes 233 shared by locations in the bounding box 223, locale data 236, as well as other relevant data. The bounding box identifier 229 is an identifier that uniquely identifies a bounding box 229 with respect to other bounding boxes 223. The boundary points 231 include a set of locations that, when connected together, define the area encompassed by the bounding box 223. The boundary points 231 may be defined using latitude and longitude coordinates or with some other system. The prefixes 233 correspond to one or more prefixes of shared by the geohashes of multiple locations within the bounding box 223. For example, if five locations within the bounding box 223 were identified by the geohases "t459uv7," "t459ug8," "t459772," "t458888," and "t458788," then the set of prefixes 233 could include one or more of the prefixes "t459," "t458," and "t45." The locale data 236 stores information specific to the political entity represented by the bounding box 223. This information can include sales tax rates, service tax rates, or other indirect or transactional tax rates to be imposed on transactions occurring within the borders of the bounding box 223, one or more rules regarding how various taxes are applied to services performed within or transactions occurring within the borders of the bounding box 223, the name of the political entity represented by the bounding box 223, the type of entity represented by the bounding box 223, and potentially other data.

The index 226 represents a data structure that cross-references individual geohash prefixes with a corresponding bounding box 223 to facilitate a determination of one or more bounding boxes 223 in which a particular location may be found based on a geohash code for the location. Accordingly, the index 226 may correspond to a key-value data store, such as a look-up table, hash table, or other key-value data store. In such embodiments, the index 226 can include one or more key-value pairs 239 that link a prefix 233 to a bounding box identifier 229.

An address 227 represents a location within a bounding box 223. An address 227 can include a building number, suite number, unit number, floor number, city, state or province, country, and postal code. An address 227 can also include a corresponding pair of coordinates 228, which may be represented using latitude and longitude. However, other systems can be used.

The index application 213 can be executed for several purposes. First, the index application 213 can be executed to determine each of the prefixes 233 of geohash codes that can be used to identify groups of locations within the bounding box 223. Second, in embodiments where a bounding box 223 can be used to represent the intersection of two or more other bounding boxes 223, the index application 213 can be used to generate those additional bounding boxes 223 and corresponding prefixes 233 of geohash codes identifying groups of locations with the additional bounding box 223. Third, the index application 213 can be executed to store key-value pairs 239 within the index 226 to increase the speed and efficiency of identifying bounding boxes 223 for a particular location.

The search application 216 is executed to identify one or more boxes 223 which encompass a location. The search application 216 may receive location information, such as an address or a latitude and longitude coordinate pair, and generate a geohash representing the location. The search application 216 can then search the index 226 for a key-value pair 239 with a prefix 233 that matches the generated geohash to identify the bounding box identifier 229 for a corresponding bounding box 223.

The client device 206 is representative of a plurality of client devices that may be coupled to the network 209. The client device 206 may include, for example, a processor-based system such as a computer system. Such a computer system may be embodied in the form of a server computer, (e.g., another physical or virtualized server within the computing environment 303 or a remotely located server computer), a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 may include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 206 or may be connected to the client device 206 through a wired or wireless connection.

The client device 206 may be configured to execute various applications such as a client application 243 or other applications. The client application 243 may be executed in a client device 206, for example, to access information provided by the search application 216 executed by the computing environment 203 or other servers. The client device 206 may be configured to execute applications beyond the client application 243 such as, for example, email applications, social networking applications, word processors, spreadsheets, or other applications.

Next, a general description of the operation of the various components of the networked environment 200 is provided. To begin, the index application 213 receives a set of bounding boxes 223 and a corresponding number of locations within each of the bounding boxes 223. The index application 213 then determines a geohash code for each of the locations in each bounding box 223. After generating a geohash code for each location in a bounding box 223, the index application 213 identifies a set of prefixes 233 that are shared by one or more of the geohash codes of the locations within the bounding box 223.

The length of each prefix and the number of prefixes identified can vary depending on the level of accuracy or precision that is required. For example, if a lower level of accuracy is acceptable in exchange for being able to perform faster searches or store fewer prefixes 233, the index application 213 may select a smaller number of shorter prefixes that are shared by larger groups of geohash codes of the locations in the bounding box 223, at the risk of geohash codes of locations outside of the bounding box 223 also sharing the same prefix. In contrast, if accuracy is paramount, the index application 213 may select a larger number of longer prefixes shared by smaller groups of geohash codes of the locations in the bounding box 223.

The index application 213 may also identify overlapping bounding boxes 223 and create new bounding boxes 223 representing the overlapping regions. In this instance, the index application 213 can determine which locations are within the new bounding box 223 and calculate corresponding geohashes to determine the appropriate prefixes 233 that are shared by the locations within the new bounding box 223. The index application 213 may further add locale data 236 from the separate bounding boxes 223 to the locale data 236 of the new bounding box 223 that represents that area of overlap.

After the bounding boxes 223 have been created and the prefixes 233 for the locations in the bounding boxes 223 have been identified, the index application 213 can generate an index 226. For each bounding box 223, the index application 213 can create a key-value pair 239 that uses one of the prefixes 233 as a key and the bounding box identifier 229 as the value to be returned when a search is performed. In some instances, the index application 213 can create a key-value pair 239 for each prefix 233 associated with a bounding box 223. In other instances, the index application 213 can create a key-value pair with multiple prefixes 233 operating as independent keys for the same bounding box identifier 229.

After the index 226 is created, the index application 213 can periodically execute to update the index 226 or to update individual bounding boxes 223 or create new bounding boxes 223. For example, new buildings could be built within a city, which could require the corresponding bounding box 223 to be updated with new location information and potentially new prefixes 233. This could, in turn, require that the index 226 be updated. As another example, a new city or county could be incorporated, requiring that new bounding boxes 223 be created to represent the new city or county and that old bounding boxes previously encompassing that area be updated.

After the index 226 is created, the search application 216 can then execute to search the index 226 on behalf of client applications 243. For example, the search application 216 could receive an address 227 of a location. In response, the search application 216 can identify the coordinates 228 of the location and generate a geohash code based at least in part on the coordinates 228. The search application 216 can then search the index 226 to identify a key-value pair 239 with a prefix 233 that matches the geohash code for the address 227. The search application 216 can then retrieve the bounding box identifier 229 to identify the appropriate bounding box 223. The search application 216 can then return, for example, locale data 236 to the requesting client application 243.

Figure 3:
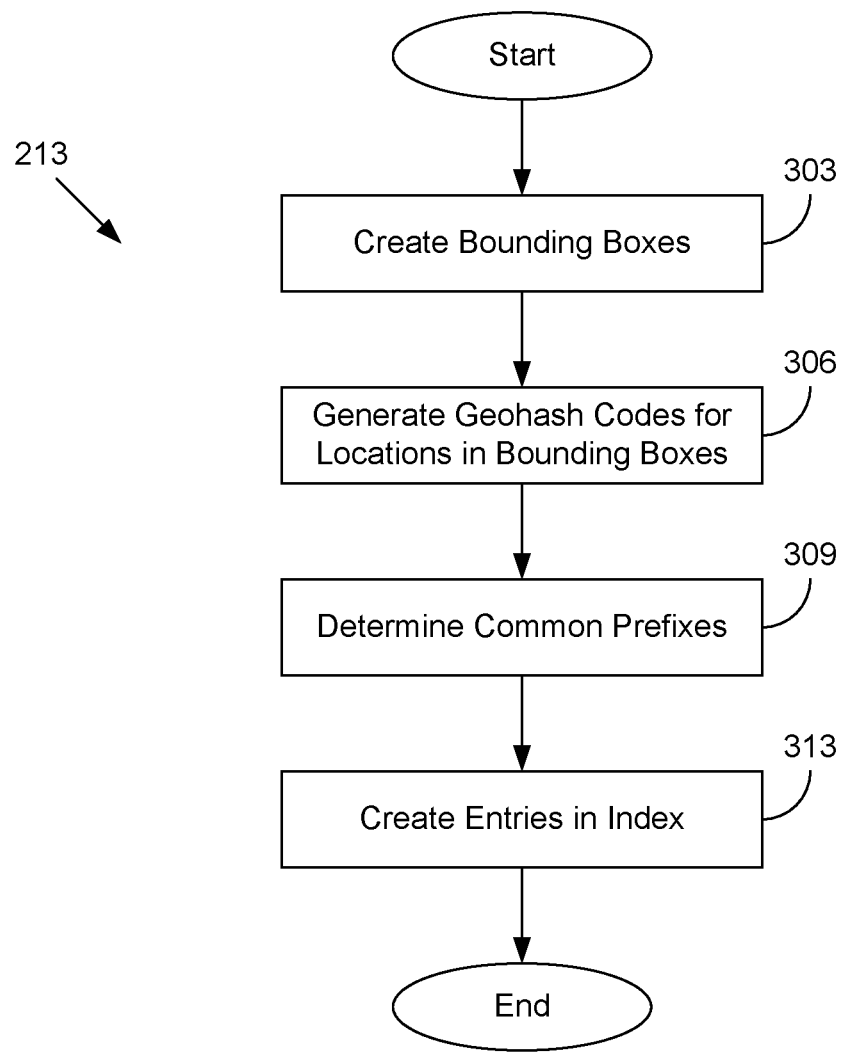
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the index application 213 according to various embodiments. It is understood that the flowchart of FIG. 3 provides merely an example of the many different types of functional arrangements that may be employed to implement the operation of the portion of the index application 213 as described herein. As an alternative, the flowchart of FIG. 3 may be viewed as depicting an example of elements of a method implemented in the computing environment 203 (FIG. 2) according to one or more embodiments.

Beginning with box 303, the index application 213 can, in some instances, create one or more bounding boxes 223 (FIG. 2). For example, the index application 213 can be provided with a first plurality of bounding boxes 223 representing the areas of various political entities. The index application 213 can then overlay the bounding boxes 223 to identify areas where the bounding boxes 223 intersect or overlap. The index application 213 could then create a new set of bounding boxes 223 based on the overlay to represent subdivisions of the original bounding boxes 223. For example, if the index application 213 were provided with bounding boxes 223 "A," "B," and "C," the index application 213 could create new bounding boxes 223 "A1," "B1," and "C1" representing the portions of bounding boxes 223 "A," "B," and "C," that do not overlap with any other bounding boxes 223. The index application 213 could then create new bounding boxes 223 "AB," "AC," "ABC," and "BC" corresponding to areas that are encompassed by respective portions of bounding boxes 223 "A," "B," and "C." The index application 213 could then copy the locale data 236 from the original bounding boxes 223 "A," "B," and "C" to the respective bounding boxes 223 "A1," "B1," "C1," "AB," "AC," "ABC," and "BC." The newly created bounding boxes 223 could then be used as the basis for generating the index 226.

Whether two or more bounding boxes 223 overlap can be determined based on a comparison of the boundary points 231 (FIG. 2) of each bounding box 223. For example, a first bounding box 223 could be subdivided along a boundary of s second bounding box 223 defined by a set of boundary points 231 enclosed within the area encompassed by the first bounding box 223. This can be performed iteratively for each additional bounding box 223 with a set of boundary points 231 that fall within the area of the first bounding box 223.

This segmentation process can optimize searching for all of the boundary boxes 223 that enclose or encompass a given location. For example, instead of search for each bounding box 223 that encompasses a given location, a search for a single bounding box 223 that represents all of the overlapping bounding boxes 223 encompassing the location could be performed. However, some implementations may omit this segmentation process.

Proceeding to box 306, the index application 213 can create a geohash code for each location within a bounding box 223 that is to be indexed. Geohash codes can be created using the previously described method. However, other approaches can also be used in alternative embodiments.

Moving on to box 309, the index application 213 identifies one or more geohash prefixes shared in common with the geohashes of individual locations within the bounding box 223. For example, if the geohashes "tyz56b3gcnp," "tyz56b3mnmg," "tyz56b3414c," "tyz56b48899," and "tyz56b4414c" correspond to locations within a bounding box 223, then the index application 213 could identify "t," "ty," "tyz," "tyz5," "tyz56," "tyz56b," "tyz56b3," and "tyz56b4" as prefixes 233 (FIG. 2) shared by the geohashes of two or more locations within the boundary box 223. However, each of these prefixes has a different level of precision. For example, shorter prefixes 233 such as the prefix "t" are more likely to be shared with the geohashes of other locations outside the boundary box 223, while longer prefixes like "tyz56b" are less likely to be shared with locations outside the boundary box 223.

Accordingly, the index application 213 may be configured to select prefixes 233 that meet or exceed a predefined level of precision. Continuing the example, if a level of precision of at least five characters were specified, then the index application 213 would select the prefix 233 "tyz56." However, if a level of precision of at least 7 characters were specified, then the index application 213 would select the prefixes 233 "tyz56b3" and "tyz56b4." The level of precision can be set as a global value applicable to all boundary boxes 223. However, the level of precision can also be set on a per boundary box 233 basis. For example, one boundary box 233 could have a level of precision of 4 characters specified while another boundary box 233 could have a level of precision of 7 characters specified. Moreover, a combination of the two approaches can also be employed in some embodiments.

Referring next to box 313, the index application 213 then creates the index 226 by storing entries for each identified prefix 233. For example, the index application 213 could create a key-value pair 239 containing one or more prefixes 233 as a key and a bounding box identifier 229 for the corresponding bounding box 229 as the value to be returned. After all of the key-value pairs 239 have been created, the indexing process then ends. However, the process can be repeated at later dates to update the index 226.

Figure 4:
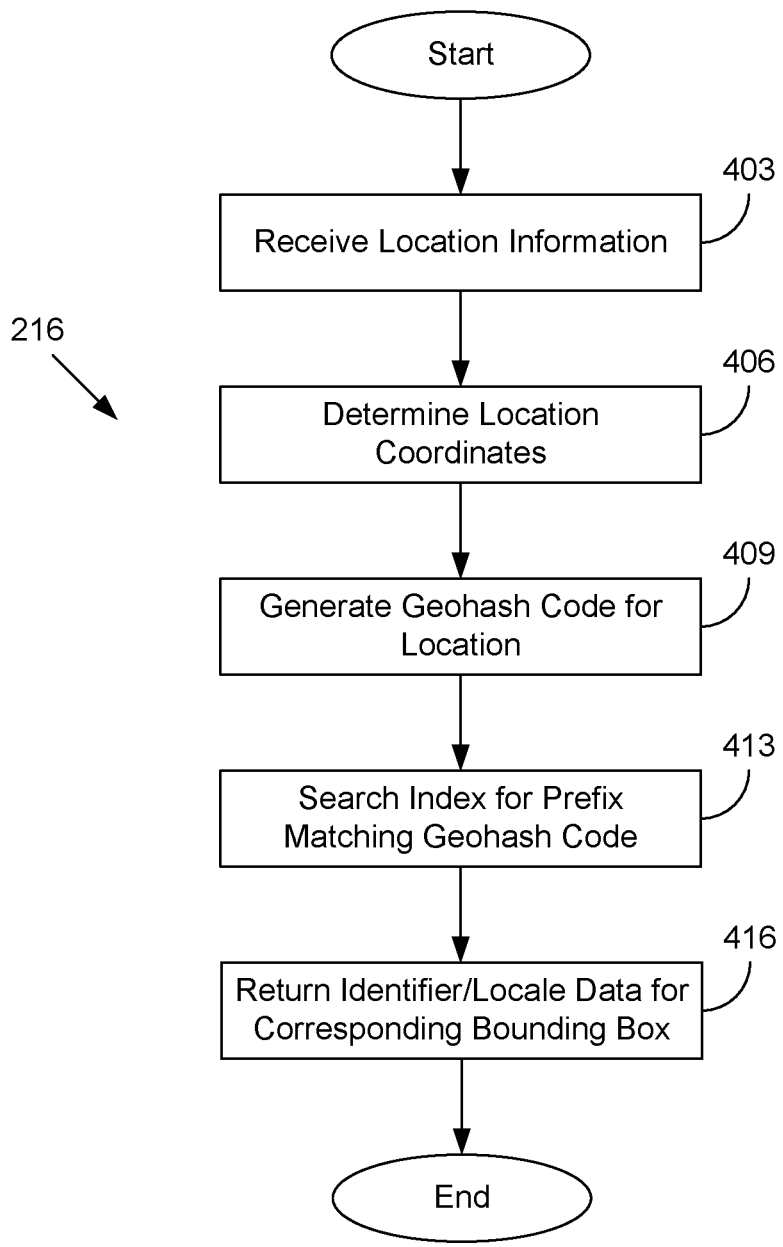
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides one example of the operation of a portion of the search application 216 according to various embodiments. It is understood that the flowchart of FIG. 4 provides merely an example of the many different types of functional arrangements that may be employed to implement the operation of the portion of the search application 216 as described herein. As an alternative, the flowchart of FIG. 4 may be viewed as depicting an example of elements of a method implemented in the computing environment 203 (FIG. 2) according to one or more embodiments.

Beginning with box 403, search application 216 receives location information. The location information can be provided in a number of formats, such as an address 227 (FIG. 2) for a location or a pair of latitude and longitude coordinates 228 (FIG. 2) for the location. The location information can be received from a client application 243 executing on a client device 206.

Proceeding to box 406, the search application 216 determines the coordinates 228 for the location if the location information provided was an address 227. For example, the search application 216 can use the address to search the data store 219 for a corresponding set of coordinates 228.

Moving on to box 409, the search application 216 generates a geohash code based at least in part on the coordinates 228 of the location. The search application 216 can use, for example, the geohashing process previously described. However, the search application 216 can also use similar geohashing processes in alternative embodiments.

Referring next to box 413, the search application 216 searches the index 226 for a key-value pair 239 containing a prefix 233 that matches the geohash code previously generated at box 409. Several alternative approaches can be employed to identify a matching prefix 233. While some of these approaches may be able to be used together, others may be mutually exclusive.

In a first example, the search application 216 can search for the longest prefix 233 that matches the geohash code. Relying on the longest prefix 233 to match the geohash code provides for the most accurate result. For example, a geohash code of "5678cdd" would match the prefix "56" and the prefix "5678c." However, the prefix "56" might be overly broad and include locations for the corresponding bounding box 223 that are not actually within the bounding box 223. Accordingly, a bounding box 223 with several longer prefixes 233 associated with it may be used instead because such a bounding box 223 is less likely to suffer from locations outside of its boundaries resolving to geohash codes with a matching prefix 233.

In a second example, the search application 216 can search for the first prefix 233 that matches the geohash code. This can result in fast searches. However, some implementations may impose constraints on the prefixes 233 stored in the index 226 to avoid inaccurate results. For example, in this implementation, prefixes 233 may be the same length or may be required to have a minimum length (e.g., at least 5 characters, 6 characters, 7 characters, 8 characters, or some other length). When these types of constraints are in place, the first prefix 233 to match the geohash code is likely to provide a sufficiently accurate mapping.

Proceeding to box 416, the search application 216 returns information about the bounding box 223 matching the prefix 233. To accomplish this, the search application 216 uses the bounding box identifier 229 stored in the key-value pair 239 with the prefix 233 that matches the bounding box 223 to identify the bounding box 223. The search application 216 then retrieves the locale data 236 and provides it to the requesting client application 243. For example, the search application 216 could retrieve one or more applicable sales tax rates from the locale data 236 and provide it to the client application 243. As another example, the search application 216 could retrieve from the locale data 236 the name of each jurisdiction or other political entity encompassing the location. After providing the requested information to the client application 243, the search is completed and execution ends.

Figure 5:
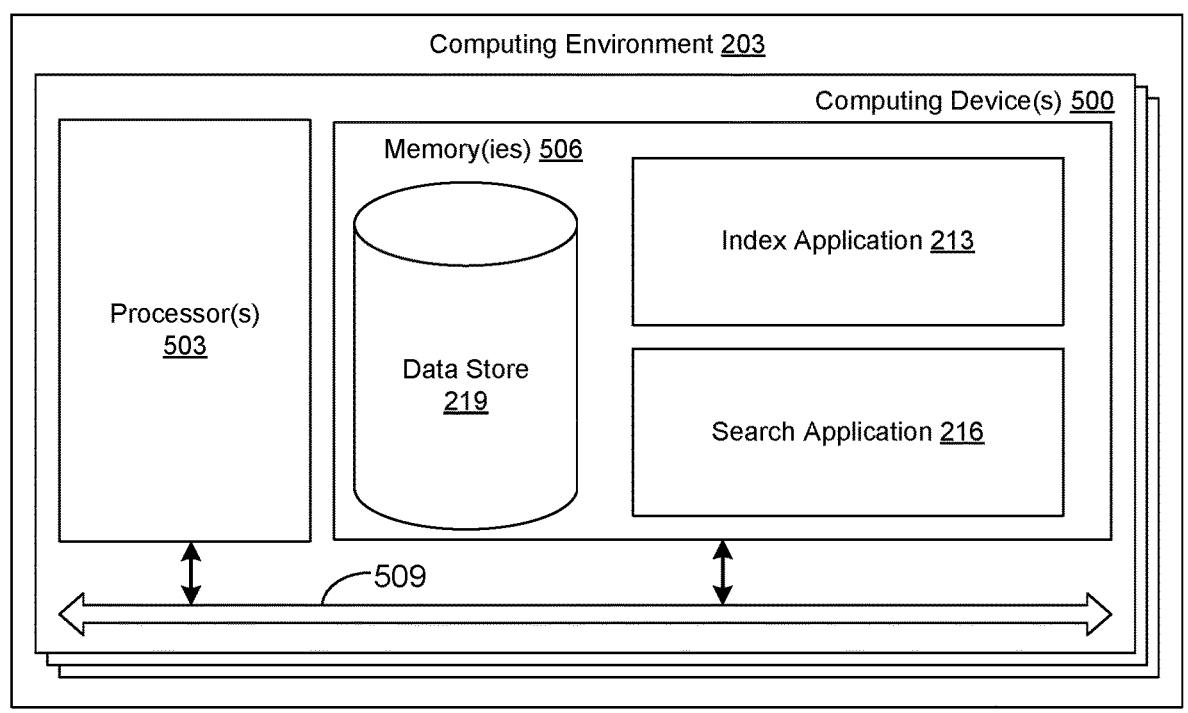
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may include, for example, at least one server computer or like device. The local interface 509 may include, for example, a data bus with an accompanying address/control bus or other bus structure as can be appreciated.

Stored in the memory 506 are both data and several components that are executable by the processor 503. In particular, stored in the memory 506 and executable by the processor 503 are the index application 213 and the search application 216, and potentially other applications. Also stored in the memory 506 may be a data store 219 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 503 may represent multiple processors 503 or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506. The local interface 509 may include additional systems designed to coordinate this communication, including, for example, performing load balancing. The processor 503 may be of electrical or of some other available construction.

Although the index application 213, the search application 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the index application 213 and the search application 216. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 503 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the index application 213 and the search application 216, that includes software or code can be embodied in any non-transitory computer-readable medium for use by or in connection with an instruction execution system such as, for example, a processor 503 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the index application 213 and the search application 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   an application comprising machine readable instructions stored in the memory that, when executed by the processor, cause the computing device to at least:
   identify an intersection of a first bounding box with a second bounding box, wherein the first bounding box and the second bounding box represent a first geographic area associated with a first sales tax rate and a second geographic area associated with a second sales tax rate;
   identify a first set of prefixes that represent a first set of geohash codes corresponding to a first set of locations that lay within the first bounding box and are outside of the intersection of the first bounding box and the second bounding box;
   identify a second set of prefixes that represent a second set of geohash codes corresponding to a second set of locations that lay within the second bounding box and are outside of the intersection of the first bounding box and the second bounding box;
   identify a third set of prefixes that represent a third set of geohash codes corresponding to a third set of locations that are located within the intersection of the first bounding box and the second bounding box;
   store the first set of prefixes in a first key-value pair linking the first set of prefixes to an area of the first bounding box that excludes the intersection of the first bounding box and the second bounding box;
   store the second set of prefixes in a first key-value pair linking the second set of prefixes to an area of the second bounding box that excludes the intersection of the first bounding box and the second bounding box; and store the third set of prefixes in a first key-value pair linking the third set of prefixes to the intersection of the first bounding box and the second bounding box.

2. The system of claim 1, wherein the computing device comprises a first computing device and the application further comprises machine readable instructions stored in the memory that, when executed by the processor, further cause the first computing device to at least:
receive a location identifier from a second computing device;
convert the location identifier to a geohash code;
determine that a prefix in the first set of prefixes is a closest match to the geohash code; and
return an identifier for the first bounding box to the second computing device.

3. The system of claim 1, wherein the computing device comprises a first computing device and the application further comprises machine readable instructions stored in the memory that, when executed by the processor, further cause the first computing device to at least:
receive a location identifier from a second computing device;
convert the location identifier to a geohash code;
determine that a prefix in the second set of prefixes is a closest match to the geohash code; and
return an identifier for the second bounding box to the second computing device.

4. The system of claim 1, wherein the computing device comprises a first computing device and the application further comprises machine readable instructions stored in the memory that, when executed by the processor, further cause the first computing device to at least:
receive a location identifier from a second computing device;
convert the location identifier to a geohash code;
determine that a prefix in the third set of prefixes is a closest match to the geohash code; and
return a first identifier for the first bounding box and a second identifier for the second bounding box to the second computing device.

5. The system of claim 1, wherein individual ones of the first set of geohash codes are based at least in part on a pair of latitude and longitude coordinates for a respective location within the first bounding box.

6. The system of claim 1, wherein individual ones of the second set of geohash codes are based at least in part on a pair of latitude and longitude coordinates for a respective location within the second bounding box.

7. The system of claim 1, wherein individual ones of the first set of geohash codes are based at least in part on a pair of latitude and longitude coordinates for a respective location within the intersection of the first bounding box and the second bounding box.

8. The system of claim 1, wherein individual ones of the first set of geohash codes, individual ones of the second set of geohash codes, and individual ones of the third set of geohash codes comprise an arbitrary length, base-32 representation of latitude and longitude for a corresponding location.

9. A method, comprising:
identifying, with a first computing device, a common prefix for a plurality of geohash codes associated with a respective one of a plurality of bounding boxes, wherein each of the plurality of bounding boxes represents a geographic area associated with a sales tax rate;
receiving, with the first computing device, a location identifier from a second computing device;
generating, with the first computing device, a geohash code based at least in part on the location identifier;
comparing, with the first computing device, the geohash code with the common prefix for each of the plurality of bounding boxes;
identifying, with the first computing device, a list of common prefixes that match the geohash code;
selecting, with the first computing device, a longest common prefix from the list of common prefixes; and
returning, with the first computing device, a list of respective geographic areas to the second computing device that are associated with the longest common prefix.

10. The method of claim 9, wherein the method further comprises returning a list of applicable tax rates to the second computing device based at least in part on the longest common prefix.

11. The method of claim 9, wherein the location identifier comprises an address and generating the geohash code is based at least in part on the location identifier further comprises:
determining, with the first computing device, a latitude coordinate value and a longitude coordinate value based at least in part on the address; and
generating, with the first computing device, the geohash code based at least in part on the latitude coordinate value and the longitude coordinate value.

12. The method of claim 9, wherein the location identifier comprises a latitude coordinate value and a longitude coordinate value.

13. The method of claim 9, wherein each bounding box further comprises a tax rule and the method further comprises returning a list of applicable tax rules to the second computing device based at least in part on the longest common prefix.

14. The method of claim 9, wherein the geohash code is represented in an alphanumeric format.

15. The method of claim 9, wherein the geohash code based at least in part on the location identifier and the plurality of geohash codes associated with the respective one of the plurality of bounding boxes comprise an arbitrary length, base-32 representation of latitude and longitude for a corresponding location.

16. The method of claim 9, wherein the geohash code based at least in part on the location identifier and the plurality of geohash codes associated with the respective one of the plurality of bounding boxes comprise an arbitrary length, base-36 representation of latitude and longitude for a corresponding location.

17. A system, comprising:
a computing device comprising a processor and a memory; and
machine-readable instructions stored in the memory that, when executed by the processor, cause the computing device to at least:
define two or more bounding boxes that represent respective geographic areas having respective defined sales tax rates, each of the bounding boxes defining a collection of one or more geohash codes that represent locations within each of the bounding boxes;
determine and store a set of geohash prefixes that represent the collection of one or more geohash codes for locations in each of the two or more bounding boxes;

receive a location for which a sales tax rate is to be determined;

generate a geohash code that represents the received location;

match the geohash code representing the received location to a longest prefix in the set of geohash prefixes to determine which of the two or more bounding boxes in which the received location is located; and return the applicable sales tax rate for the bounding box in which the received location is located.

18. The system of claim 17, wherein the machine-readable instructions that determine the geohash code that represents the received location further include instructions that cause the computing device to at least:

determine a latitude coordinate value and a longitude coordinate value for the location; and generate the geohash code based at least in part on the latitude coordinate value and the longitude coordinate value.

19. The system of claim 17, wherein each bounding box is further associated with a tax rule and the machine-readable instructions further include instructions that cause the computing device to return the tax rule associated with the bounding box in which the received location is located.

20. The system of claim 17, wherein the geohash code comprises an arbitrary length, base-32 representation of latitude and longitude for the received location.

\* \* \* \* \*